(12) United States Patent
Contino

(10) Patent No.: US 7,679,777 B2
(45) Date of Patent: Mar. 16, 2010

(54) JOB SUPPLEMENT FOR ELECTRONIC PRINTING MACHINES

(75) Inventor: James A. Contino, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1091 days.

(21) Appl. No.: 11/120,589

(22) Filed: May 3, 2005

(65) Prior Publication Data

US 2006/0250659 A1    Nov. 9, 2006

(51) Int. Cl.
    H04N 1/00    (2006.01)
    G06F 3/12    (2006.01)
(52) U.S. Cl. .................... 358/1.6; 358/1.1; 358/1.13; 358/1.18
(58) Field of Classification Search ................ 358/450, 358/1.1, 1.6, 1.9, 1.13, 1.15, 1.18, 474, 449, 358/1.2, 1.5, 1.12, 1.17, 475, 486, 487, 488, 358/489, 491, 493, 494, 496, 497, 498; 355/23, 355/40, 24; 399/1, 6, 7, 95, 364, 379; 347/129, 347/173, 1, 2, 3, 4, 5, 14, 23; 382/312, 313, 382/315, 318, 319, 322, 323

See application file for complete search history.

(56) References Cited

U.S. PATENT DOCUMENTS

| | | | |
|---|---|---|---|
| 5,081,494 A | 1/1992 | Reed et al. | |
| 5,119,206 A * | 6/1992 | Rourke et al. | 358/296 |
| 5,191,429 A | 3/1993 | Rourke | |
| 6,667,814 B1 | 12/2003 | Tillotson | |
| 6,813,038 B1 | 11/2004 | Kadowaki | |
| 6,937,369 B2 * | 8/2005 | Shih et al. | 358/486 |
| 2005/0140991 A1 * | 6/2005 | Ogiwara et al. | 358/1.2 |

* cited by examiner

Primary Examiner—Dov Popovici
(74) Attorney, Agent, or Firm—Fay Sharpe LLP

(57) ABSTRACT

A system and method for printing is provided including actuating a job supplement process on a user interface to enable a job supplement print job to be built up from opposing sides of an object. The system initiates manual document handling mode. The user places a first side of an object to be scanned on a platen of a printing system. The system scans a first side image of the object, the scanning includes a scanner for scanning the platen and converting objects on the platen to image signals. The system stores the first side image of the object. The user turns the object onto a second side and places the second side on the platen. The system scans a second side image of the object. The system further prints the first side image adjacent to the second side image in a single pass on a media sheet.

21 Claims, 11 Drawing Sheets

FIG. 6

| JOB PROGRAM | | | |
|---|---|---|---|
| JOB: ID Copy DEFAULT | | | |

152 — Job Scorecard

Job Identification
1 DEFAULT

Destination
Print & Delete

Quantity
1

Output
Stacker Collated

Page Numbering
Off

---

PAGE LEVEL / COVERS / Job Types & Tickets

Job Ticket for: 1     Account: DEFAULT     Close

150

| Job Type: ID Copy | Page Level: Basic | Page Level: Special |
|---|---|---|
| Job Level | | |
| Job Identification: 1 DEFAULT | Document Description: 8.5 x 11.0 Standard | Crop: Off |
| Destination: Print & Delete | Paper Stock: 8.5 x 11.0 Standard White | Window: Off |
| Quantity: 1 | Reduce/Enlarge: 100% | Image Shift: Off |
| Output: Stacker Collated | Sides Imaged: 2→1 (Same Side) | Merge: Off |
| Page Numbering: Off | Image Quality: Standard Sharpness On | Rotate: Off |

166
67

Restore Defaults    Interrupt    Printer Options    Stop Scan    Stop Print    Job Supplement    Start Scan 164    162

62

JOB SUPPLEMENT FOR ELECTRONIC PRINTING MACHINES

BACKGROUND

The present exemplary embodiments relate to media (e.g., document or paper) handling systems and systems for printing thereon. More particularly, the embodiments relate to a job supplement process for enabling print jobs to be built up to meet specialized job requirements.

Many users find it useful to include a copy of, for example, identification (ID) sized documents such as an individual's driver's license, ID card, health insurance card, business card, social security card, credit card, certificate, passport, et. al. (collectively referred to hereinafter as ID cards), in an individual's record so that information contained on these ID cards can be later referenced. Most ID cards contain important information on both front and back sides of the card. One problem with current devices is that while they are well-suited to capture information on the ID cards by making a copy of them, they cannot print the information from both the front and back sides of the card on the same face of a page. This results in a person's information contained on two separate pages (or the front and back side of a page if copying in duplex mode). The result is two separate pieces of information in two different locations. With current copiers, the only way to achieve all information on a single side of a sheet of paper is to make a copy of one side of the ID card, reload the output for re-imaging and make a copy of the second side. This method is cumbersome and confusing, as it requires the user to understand how the paper will feed through the machine and in what orientation the new image will be placed in relation to the first.

Electronic printing systems typically employ a scanner for scanning image bearing documents and convert the image to image signals or pixels for use in making prints. The job source usually consists of a quantity of documents having the same or similar parameters that enable the documents to be scanned en masse and without special treatment for individual documents. In some cases, however, the job may include diverse documents that require special treatment and therefore cannot be scanned with the other documents in a single scan. Similarly, the job program may necessitate that some documents be processed apart from the other documents that comprise the job. In other cases, the documents may differ in size and thus require different scaling ratios to provide prints of the same size. Some documents in a job may be fragile or unable to pass through an automatic document handler, and thus require manual handling. In these and the manifold other situations in which special processes are required, it would be highly desirable if a system or procedure to allow these special cases to be handled expeditiously and efficiently existed.

In view of some of the aforementioned job requirements, it may be desirable to "build" a job on a segment-by-segment basis. In U.S. Pat. No. 5,081,494 to Reed et al. (Issued: Jan. 14, 1992) various parts of a job are merged through use of a job supplement mode. Through this mode, the job supplement function is used to append content to a job as it is being scanned into the printing system. That is, when the job supplement mode is engaged, any number of additional documents or groups of documents may be scanned in with the job currently being scanned. Upon supplementing the job at the scanner, an END JOB icon is selected, and the supplemented job is stored in a memory section of the printing system. The '494 patent provides a job supplement process for a printing system effective when actuated to enable a print job to be built up from a plurality of smaller print jobs, the printing system including document scanning means with a platen on which documents to be scanned are placed, the scanning means having automatic and manually assisted document handling modes for inputting documents to the platen for scanning and converting the document images to image signals for use in making prints, the steps comprising: automatically implementing job supplement in response to operation of the scanning means in the manually assisted document handling mode; manually implementing the job supplement in response to operation of the scanning means in the automatic document handling mode; and preventing scanning of the next job by the scanner in response to implementation of the job supplement process.

It is also sometimes desirable to make multiple copies of small images as for example of an ID card or business card. However, since the image source, i.e., a business card, is smaller than normal, conventional copying by placing the card on the platen of a copier and running the desired number of copies cannot readily be done. This is because the copier is designed to make a copy of the entire platen area so that the resulting copies that are made will include not only the image from the card but also a large non-image area around the card. In that situation, to obtain copies of the small image, the copies that are made must then be cut to remove the unwanted and extraneous non-image areas or a make ready original prepared. This results in a substantial waste of copy paper, excessive copying costs since a full copy must be made for each image desired, and a very time consuming and inefficient job. And in cases where the multiple up image is a duplex image, copying becomes almost impossible due to the inability to accurately register and size the second side image with the first side image.

U.S. Pat. No. 5,191,429 to Rourke provides a process for printing reduced size multiple up images in an electronic reprographic printer, comprising the steps of: providing an electronic page comprised of image signals representative of the multiple up image; from the electronic page, determining the size of the multiple up image; determining the size of the paper stock on which the multiple up images are to be printed by the printer; determining the maximum number N of the multiple up images that can be optimally fitted onto the paper stock without interference; and in a single pass, using the electronic page to print the multiple up images N times on each of the paper stock.

The U.S. Pat. Nos. 5,081,494 and 5,191,429 patents are incorporated herein by reference in their entirety.

BRIEF SUMMARY

A system and method for printing is provided including actuating a job supplement process on a user interface to enable a job supplement print job to be built up from opposing sides of an object. The system initiates manual document handling mode. The user places a first side of an object to be scanned on a platen of a printing system. The system scans a first side image of the object. The scanning includes a scanner for scanning the platen and converting objects on the platen to image signals. The system stores the first side image of the object. The user turns the object onto a second side and places the second side on the platen. The system scans a second side image of the object. The system further prints the first side image adjacent to the second side image in a single pass on a single side of a media sheet and, upon completion of scanning of the second side image, the system disables the job supplement process to enable scanning of the next job by the scanner.

A printing system is provided comprising a user interface. The user interface includes an ID copy mode including a series of instructions. The instructions direct the user to place side one of an object onto a platen in a given field of the platen. The user is then directed to press a start button on the user interface for scanning a first side image. The user then is directed to turn the object to a second side and place onto the platen in the same given field and then to press the start button on the user interface for scanning a second side image. The system applies the first side image and the second side image in a single pass to a same side of a media sheet for printing.

A method for printing includes providing a user interface. The user interface includes an ID copy mode. The ID copy mode instructs a user including the following: placing a first side of an object onto a platen in a given field of the platen; pressing a start button on the user interface for scanning a first side image; turning the object to a second side and placing a second side onto the platen in the same given field of the platen; and, pressing the start button on the user interface for scanning a second side image. The method further includes printing the first side image and the second side image in a single pass to a same side of a media sheet for printing.

BRIEF DESCRIPTION OF THE DRAWINGS

FIG. 6 is a view of the User Interface touchscreen display in the Job Programming mode depicting Job Ticket and Job Scorecard examples;

DETAILED DESCRIPTION

The present application provides for a system and method enabling front and back images of, for example, an ID card or object to be printed, in a single pass, adjacent one another on the same face of a page, thereby minimizing or eliminating confusion, lost, or missing information. Printing both front and back images on a single side of paper enables the information to be readily accessible.

Figure 1:
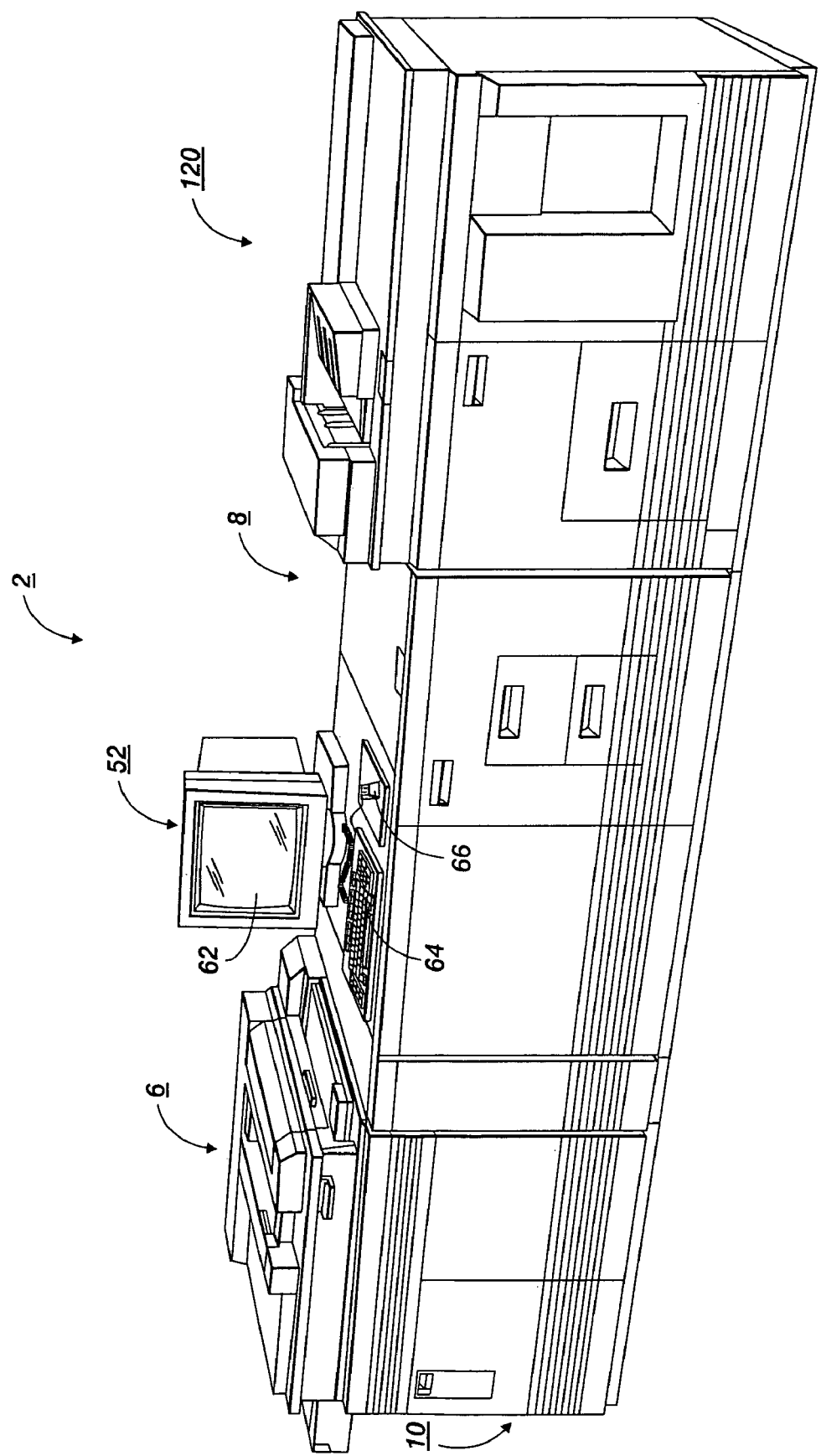
FIG. 1 is a view depicting an electronic printing system with the job supplement allowing building of print jobs in response to special programming instructions.
Figure 2:
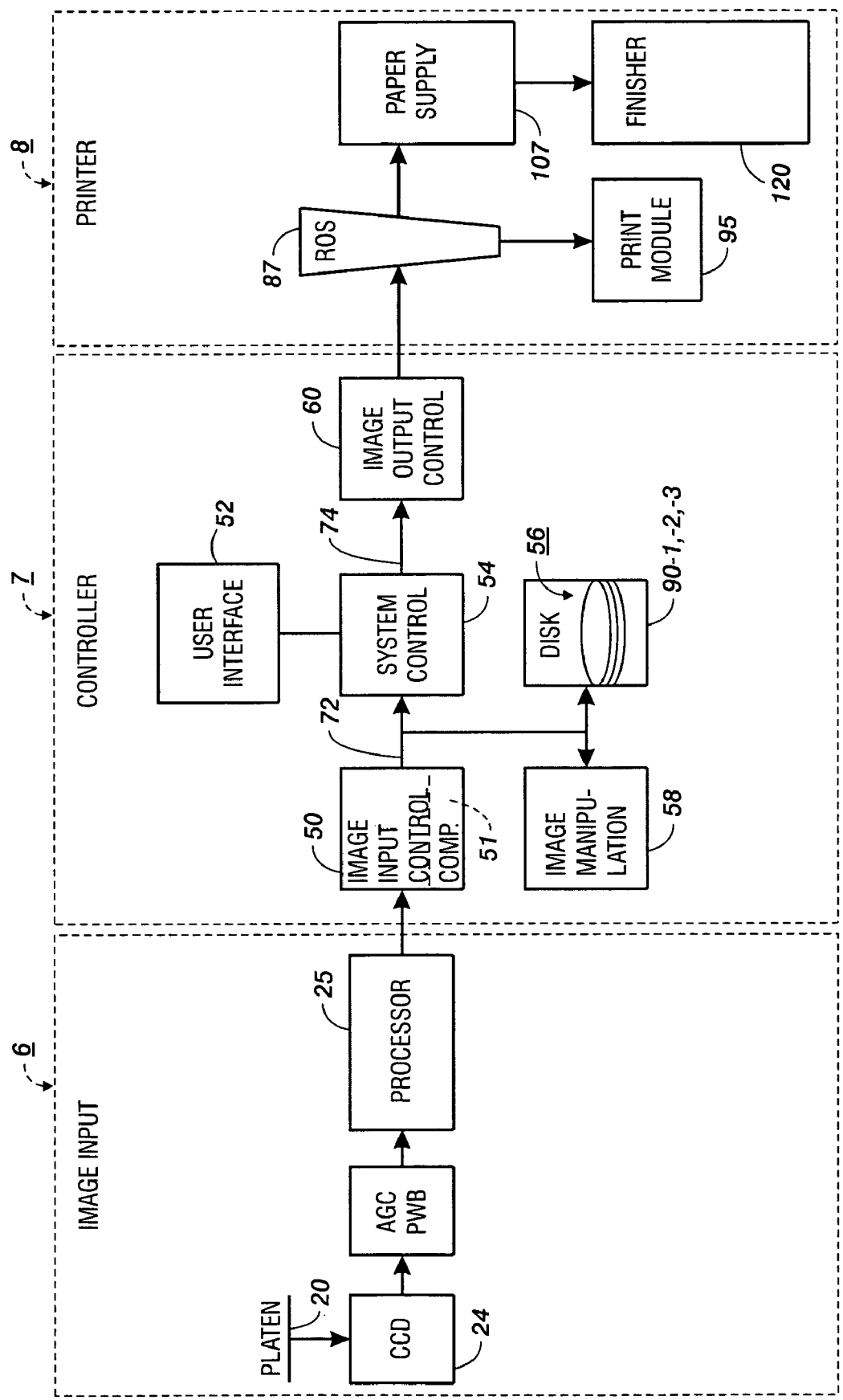
FIG. 2 is a block diagram depicting the major elements of the printing system shown in FIG. 1.

Referring to FIGS. 1 and 2, there is shown an exemplary laser based printing system 2 for processing print jobs in accordance with the teachings of the present embodiments. Printing system 2 for purposes of explanation is divided into a scanner section 6, controller section 7, and printer section 8. While a specific printing system is shown and described, the present embodiments may be used with other types of printing systems such as ink jet, ionographic, etc.

Figure 3:
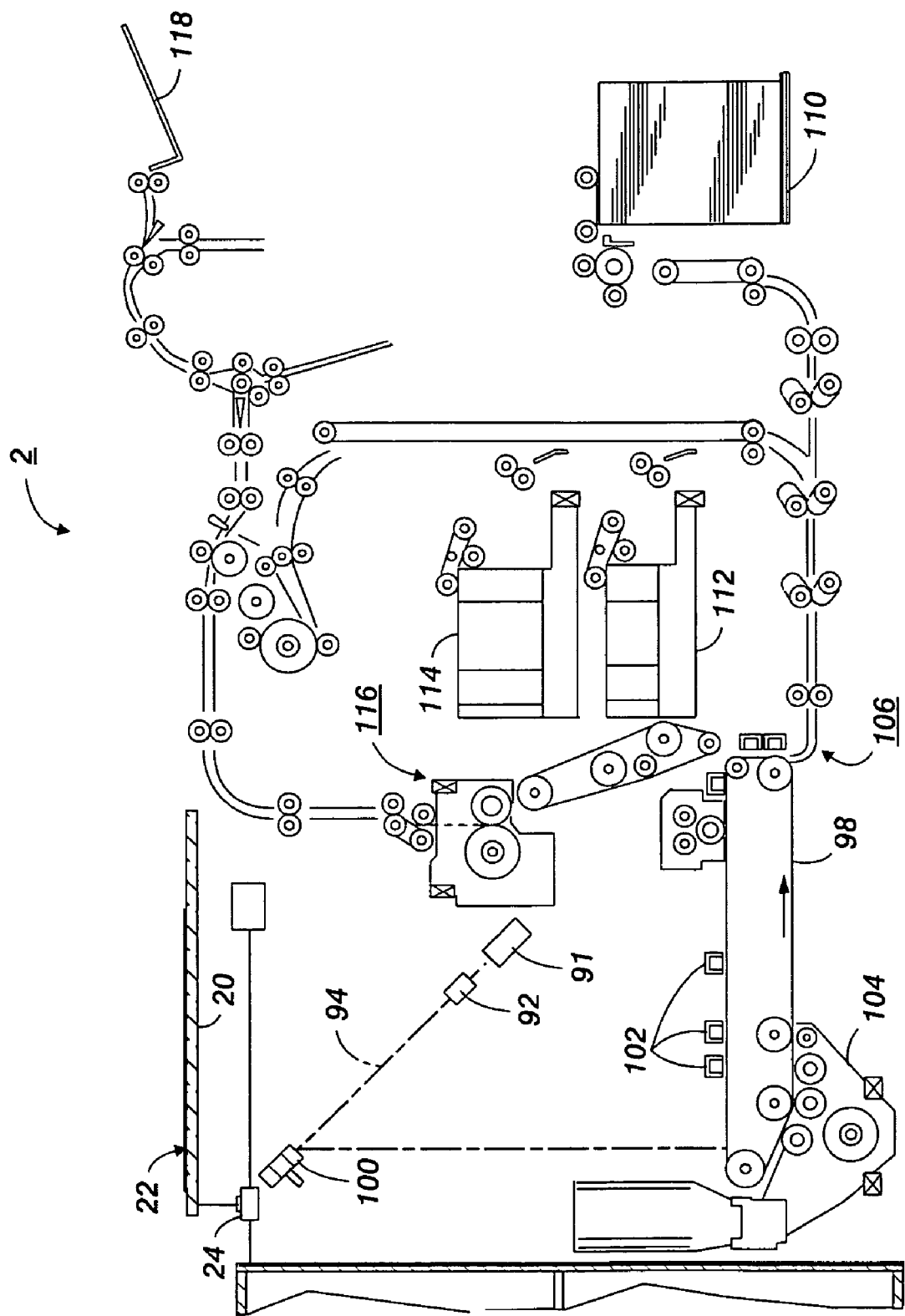
FIG. 3 is a plan view illustrating the principal mechanical components of the printing system shown in FIG. 1.
Figure 4:
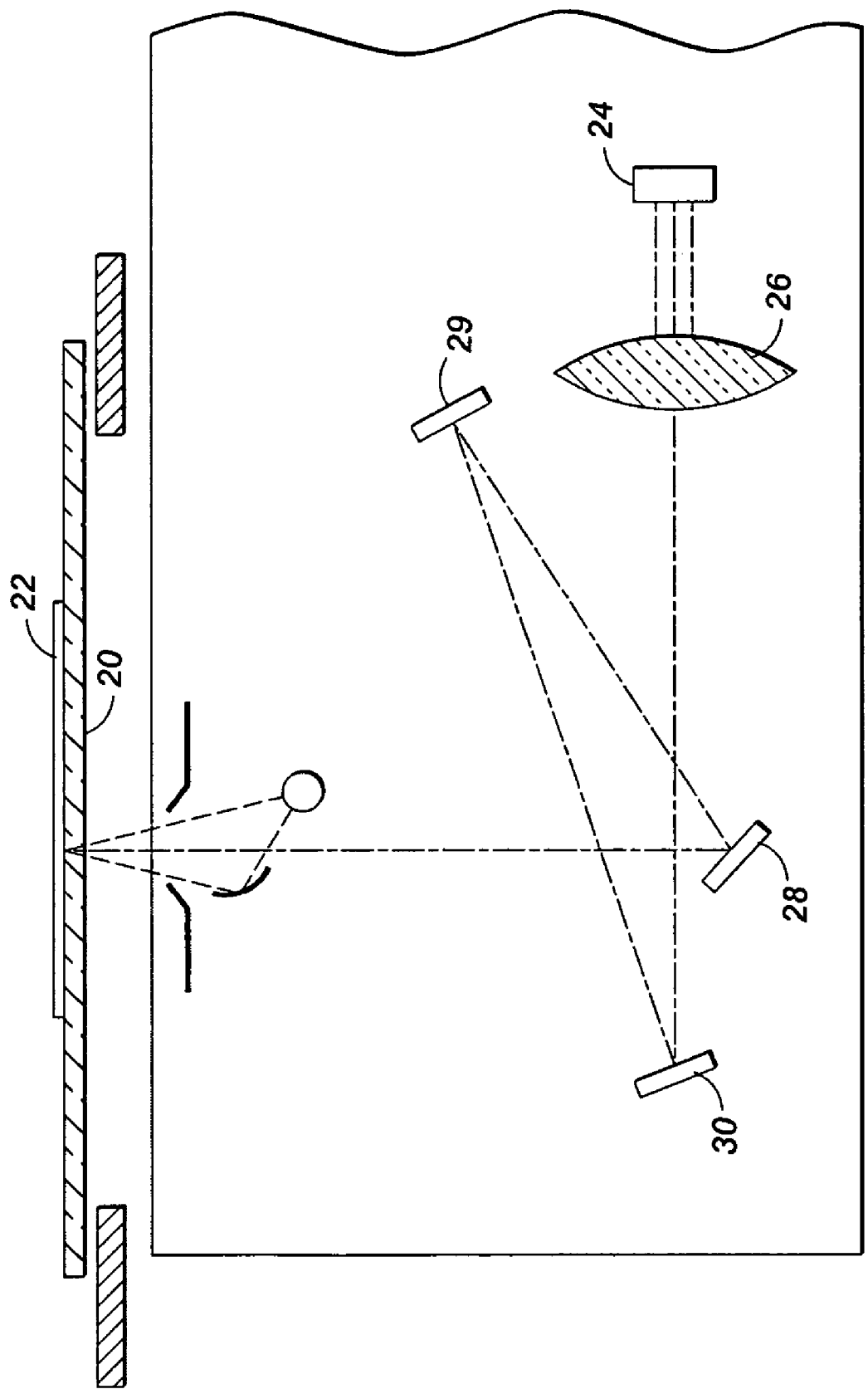
FIG. 4 is a schematic view showing certain construction details of the document scanner.

Referring particularly to FIGS. 2-4, scanner section 6 incorporates a transparent platen 20 on which the document, object, or ID card 22 to be scanned is located. One or more linear arrays 24 are supported for reciprocating scanning movement below platen 20. Lens 26 and mirrors 28, 29, 30 cooperate to focus array 24 on a line-like segment of platen 20 and the document being scanned thereon. Array 24 provides image signals or pixels representative of the image scanned which after suitable processing by processor 25, are output to controller section 7.

Processor 25 converts the analog image signals output by array 24 to digital and processes the image signals as required to enable system 2 to store and handle the image data in the form required to carry out the job programmed. Processor 25, for example, can provide enhancements and changes to the image signals such as filtering, thresholding, screening, cropping, etc.

Document 22 to be scanned may be manually positioned on platen 20 by a user. For operation in the manual mode, a document handler (not shown) is pivoted upwardly to expose platen 20. This permits the document 22 to be manually placed on platen 20 following which array 24 is operated to scan the ID object or card. When scanning is completed, the ID card 22 is removed to clear platen 20 for the next document. The ID card can be manually positioned consecutively face down and face up on platen 20 with an upper left hand corner of the ID card aligned with positioning indicia (not shown) located along the border of platen 20. By programming the system, both sides of the ID card are scanned and stored.

Referring to FIGS. 2 and 3, printer section 8 comprises a laser type printer and for purposes of explanation is separated into a Raster Output Scanner (ROS) section 87, Print Module Section 95, Paper Supply section 107, and Finisher 120. ROS 87 can have a laser 91, the beam of which can be split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by corotrons 102 at a charging station preparatory to exposure by imaging beams 94. The latent electrostatic images are developed by developer 104 and transferred at transfer station 106 to a print media delivered by Paper Supply section 107. The media, as will appear, may comprise any of a variety of sheet sizes, types, and colors. For transfer, the print media is brought forward in timed registration with the developed images on photoreceptor 98 from either a main paper tray 110 or from auxiliary paper trays 112 or 114. The developed images transferred to the print media are permanently fixed or fused by fuser 116 and the resulting prints discharged to output tray 118.

Referring to FIGS. 1 and 2, controller section 7 is, for explanation purposes, divided into an image input controller 50, User Interface (UI) 52, system controller 54, main memory 56, image manipulation section 58, and image output controller 60.

The scanned image data input from processor 25 of scanner section 6 to controller section 7 is compressed by image compressor/processor 51 of image input controller 50. As the image data passes through compressor/processor 51, it is segmented into slices N scanlines wide, each slice having a slice pointer. The compressed image data together with slice pointers and any related image descriptors providing image specific information (such as height and width of the document in pixels, the compression method used, pointers to the compressed image data, and pointers to the image slice pointers) are placed in an image file. The image files, which represent different print jobs, are temporarily stored in system memory 61 which comprises a Random Access Memory or RAM pending transfer to main memory 56 where the data is held pending use.

As best seen in FIG. 1, UI 52 can include a combined operator controller display or panel consisting of an interactive touchscreen 62, keyboard 64, and mouse 66. UI 52 interfaces the operator with printing system 2, enabling the operator to program print jobs and other instructions, to obtain system operating information, instructions, programming information, diagnostic information, etc. Items displayed on touchscreen 62 such as files and icons are actuated by either touching the displayed item on screen 62 with a finger or by using mouse 66 to point cursor 67 to the item selected and keying the mouse.

Main memory 56 can have plural hard disks 90-1, 90-2, 90-3 for storing machine Operating System software, machine operating data, and the scanned image data currently being processed.

When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 where the additional processing steps such as collation, scaling, make ready, decomposition, etc. are carried out. Following processing, the data may be returned to main memory 56, sent to UI 52 for display on touchscreen 62, or sent to image output controller 60.

Image data output to image output controller 60 can be decompressed and readied for printing by image generating processors. Following this, the data can be output by dispatch processors to printer section 8. Image data sent to printer section 8 for printing is normally purged from memory 56 to make room for new image data.

Figure 5A:
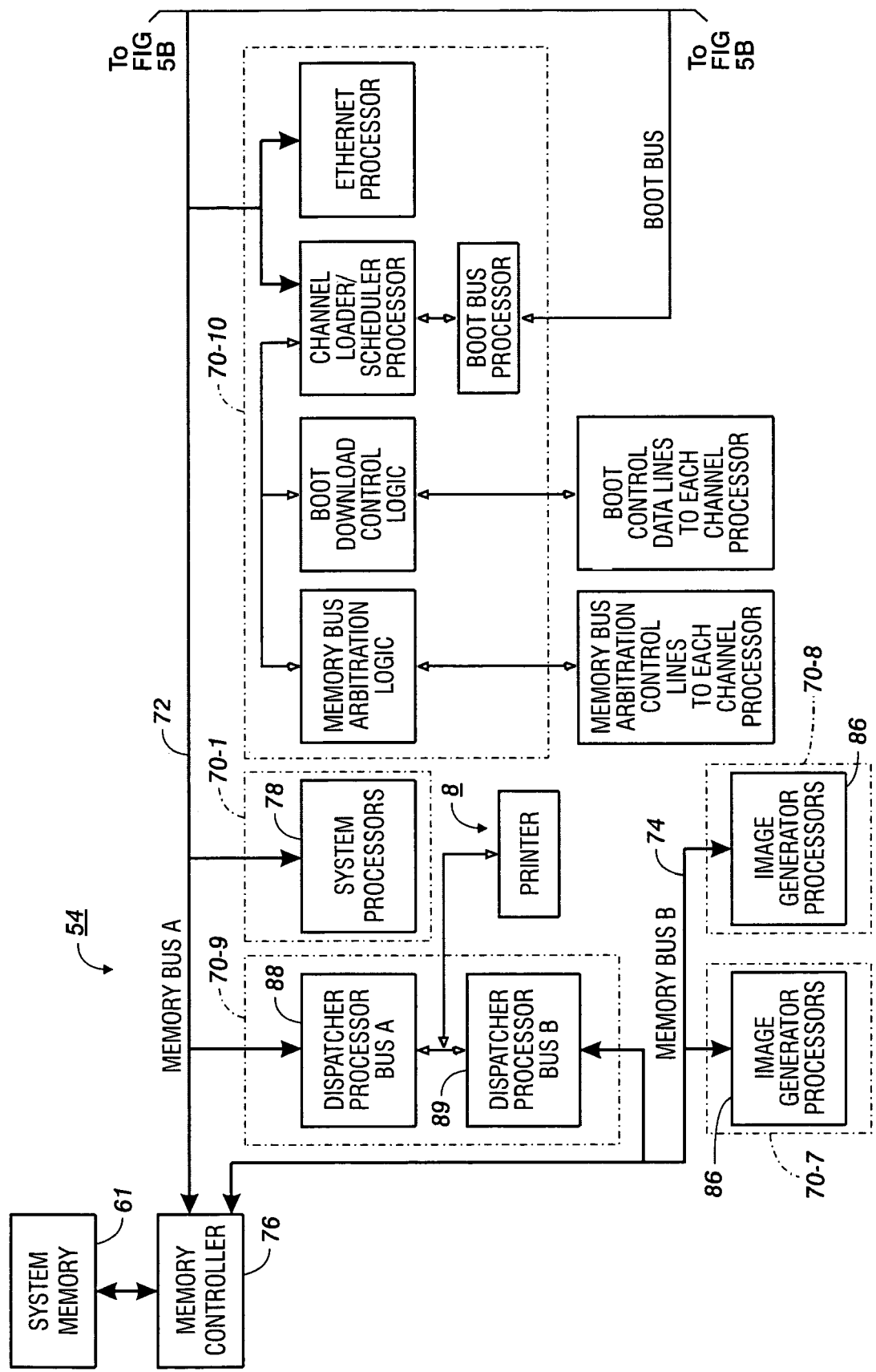
FIGS. 5A, 5B, and 5C comprise a schematic block diagram showing the major parts of the system control section.
Figure 5B:
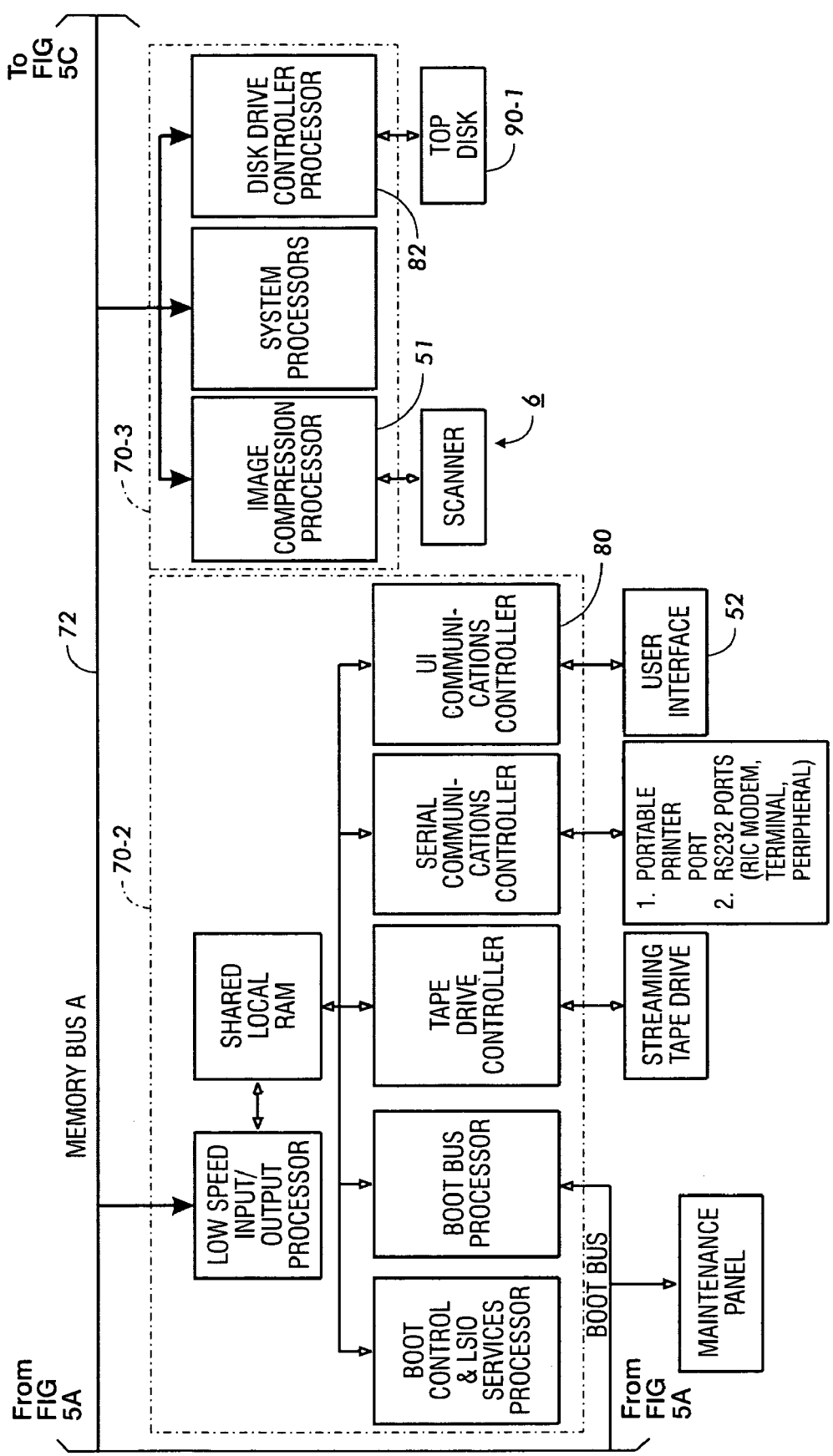
Figure 5C:
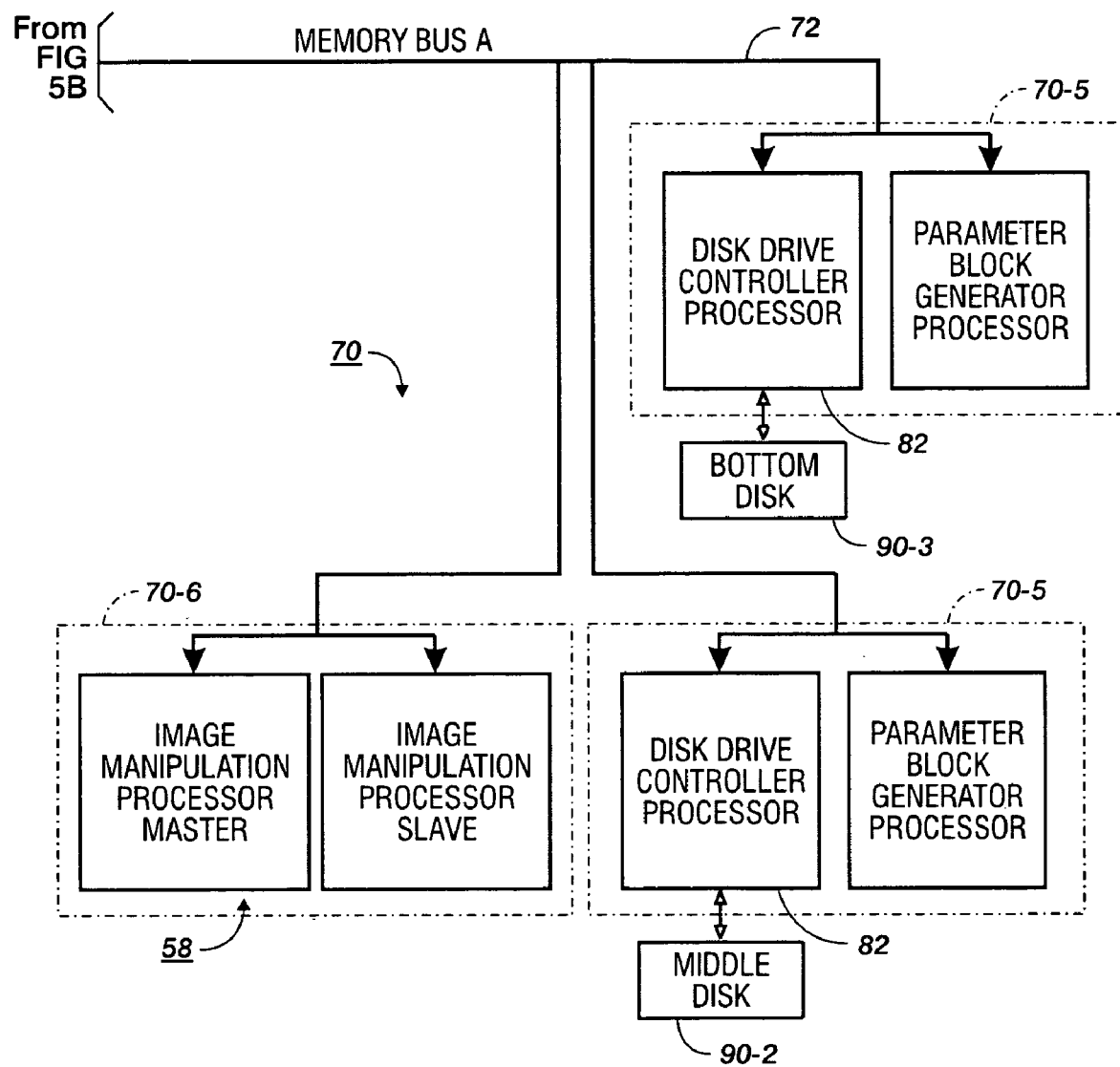

Referring particularly to FIGS. 5A-5C, control section 7 includes a plurality of Printed Wiring Boards (PWBs) 70, PWBs 70 being coupled with one another and with System Memory 61 by a pair of memory buses 72, 74. Memory controller 76 couples System Memory 61 with buses 72, 74. PWBs 70 include system processor PWB 70-1 having system processors 78; low speed I/O processor PWB 70-2 having UI communication controller 80 for transmitting data to and from UI 52; PWBs 70-3, 70-4, 70-5 having disk drive controller/processors 82 for transmitting data to and from disks 90-1, 90-2, 90-3 respectively of main memory 56 (image compressor/processor 51 for compressing the image data is on PWB 70-3); image manipulation PWB 70-6 with image manipulation processors of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10.

Referring to FIG. 6, an ID copy job can be pre-programmed in a Job Program in which there is displayed on touchscreen 62 a Job Ticket 150 and a Job Scorecard 152. Job Ticket 150 displays various job options available for programming the job while Job Scorecard 152 displays the basic instructions to the system for printing the job and the state transitions when operating in the ID Copy mode. On actuation of START SCAN icon 162, a check is made to determine if a programming conflict exists (Conflict Detected). If so, an END JOB icon (not shown) is enabled, preventing scanning of a new job until the conflict is cleared and the END JOB icon is disabled.

Where the job supplement function 164, or ID Copy mode, is enabled, the system initiates manual document handling and presents a series of instructions to the user (refer to FIGS. 6-10). It is to be appreciated that the UI and Touchscreens, as shown in FIGS. 6-10, are by way of example only. Various of the disclosed Touchscreens, including other features and functions, or alternatives thereof, may be combined into other different systems or applications. First the user is instructed to place side one of an object onto the platen in a specified field. The user is then prompted to press a start button on the user interface which enables the first side of the object to be scanned. The user is then instructed to turn the object to a second side and place the object onto the platen in the same specified field. It is to be appreciated that the scan area can be a portion of the entire area of the platen. The user is once again instructed to press the start button which enables the second side on the object to be scanned. As the images representing each side of the ID card are scanned in, image data corresponding to a first side image and a second side image 160a, 160b are processed, compressed, and stored on main memory 56. The system then prompts the user whether a default print configuration (i.e. print images adjacent to one another and actual size) is to be printed or whether the user desires to modify the default print settings. The image data comprising the job may be accessed in main memory 56 and displayed on touchscreen 62 of UI 52. Preferably, touchscreen 62 is sized sufficiently large to enable both sides of the scanned in job to be displayed at once. Through the use of the various programming selection icons displayed on touchscreen 62. Both sides of the ID card that make up the job may be edited, moved, processed, etc. to build up the job in the fashion desired. For example, the images can be moved to different locations in the job (i.e. horizontally or vertically aligned), enlarged, deleted, etc. until the job is set up in the manner desired. Further, where differences exist between the job parts, i.e., different resolution, size, etc., adjustment may be made using UI 52 to render the various parts of the job compatible with one another. It is to be appreciated that the images can be enlarged (i.e. automatically scaled) such that the first and second images each comprise a majority of one half of the media sheet according to media sheet size and image orientation.

END JOB icon is actuated (ENDJOB selected) or where the job is completed (ENDJOB complete), END JOB icon is removed. The ENDJOB function is set to default after both sides of a single ID card have been scanned and printed.

The images 160a, 160b can be small images. As described above, the images may be derived from opposing sides of the object by scanning, or can be derived by cropping an image out of a larger document. Normally, a pair of images 160a, 160b is printed on a single sheet of paper stock or other suitable print material. For ease of reading, the images can be enlarged or scaled to fill generally the entire available space of the paper stock.

In the example shown, the image source is in the form of an ID card, i.e., card 22, which is scanned in by image input section 4 with the image content converted to image signals or pixels. As in the case of any document, scaling, editing, merging, etc. may be done prior to printing.

Where the images 160a, 160b are derived from a document such as card 22, it will be understood that card 22, because of its small size, includes a width and a length that will occupy only a part of the area of platen 20 that will be scanned. For example, the object area can be less than about 20 percent of the platen area. As a result, the scanned image that results will include not only the image 160a, 160b, but the entire platen area that is scanned as well. To remove the extraneous image areas following scanning, the scanned image can be cropped.

Figure 7:
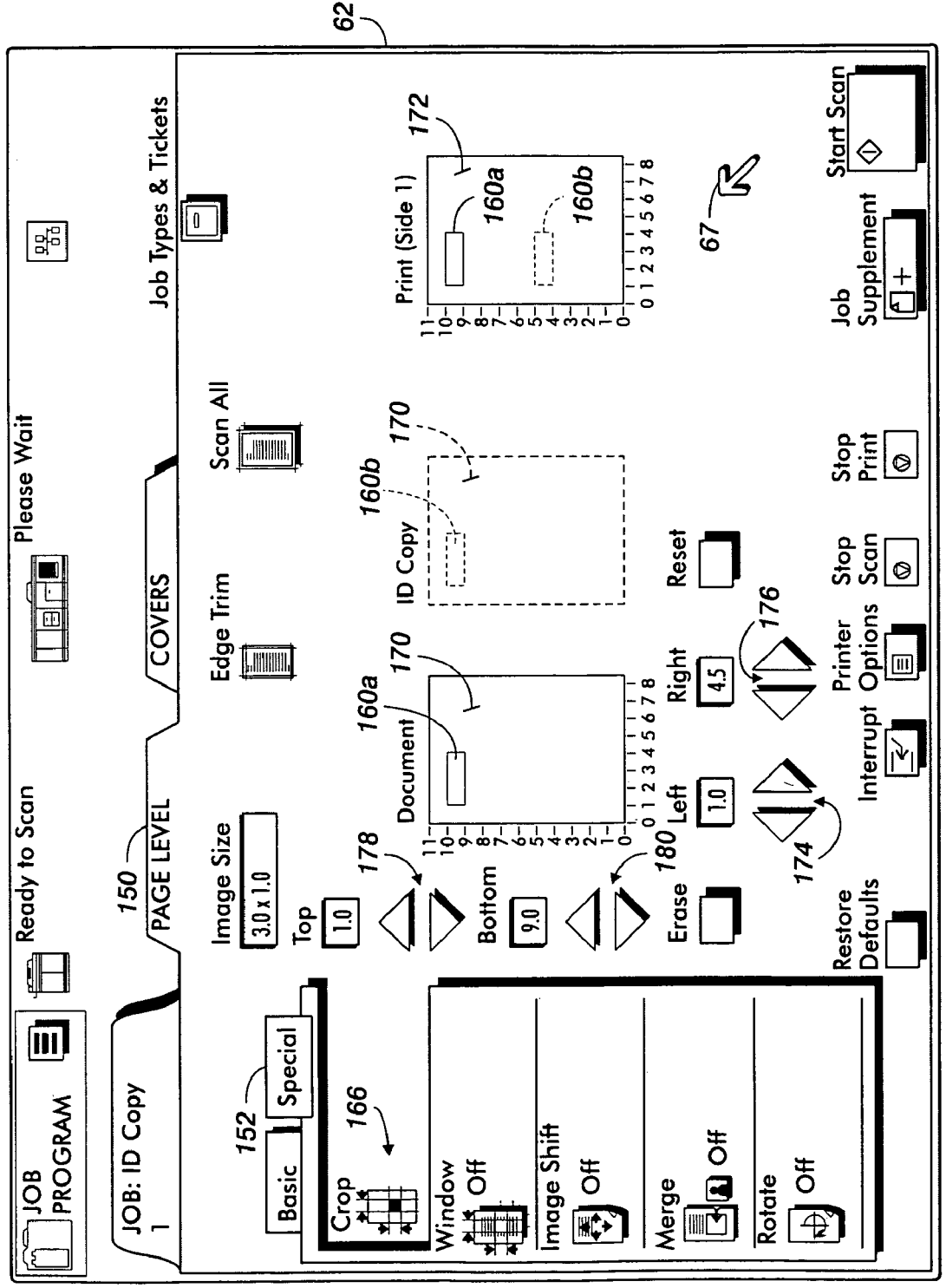
FIG. 7 is a view of the User Interface touchscreen display depicting the "ID COPY MODE" selection icon.

Referring to FIG. 7, to perform cropping, crop icon 166 at the "Special" Job Ticket level is actuated. Actuation of crop icon 166 displays "Special" scorecard 152 on touchscreen 62 showing Crop icon 166 opened together with Document display 170 representing the scanned image. Included in Document display 170 is a darkened area representing images 160a, 160b. A Print display 172 depicts the scanned images 160a, 160b as they would appear if printed on the Paper Stock currently selected.

To enable the extraneous and unwanted parts of the scanned image to be removed, i.e., cropped, left and right side scrolling icons 174, 176 are displayed on screen 62 below the Document display 170. Through selective actuation of icons 174, 176, the side margins of images 160a, 160b are set. Top and bottom scrolling icons 178, 180 similarly allow the top and bottom margins of the images 160a, 160b to be set. The image source, i.e., card 22, can then rescanned with the cropped out image areas omitted and the image signals stored in main memory 56.

To facilitate registration of the opposing side images of a like-sized duplex image source with one another, the document, i.e., card 22, at the time of scanning is preferably located in registered position on platen 20 by abutting the card, during each side scan, against suitable side and edge registration guides (not shown) on platen 20. In this arrangement, only a portion of the total area of the platen is scanned, i.e. a minority portion which includes substantially the object area. Where this is done, the cropping procedure for the second side image described above may be avoided since the first and second side images are in registered relation with one another and hence the location and size of both scanned images are the same.

Figure 8:
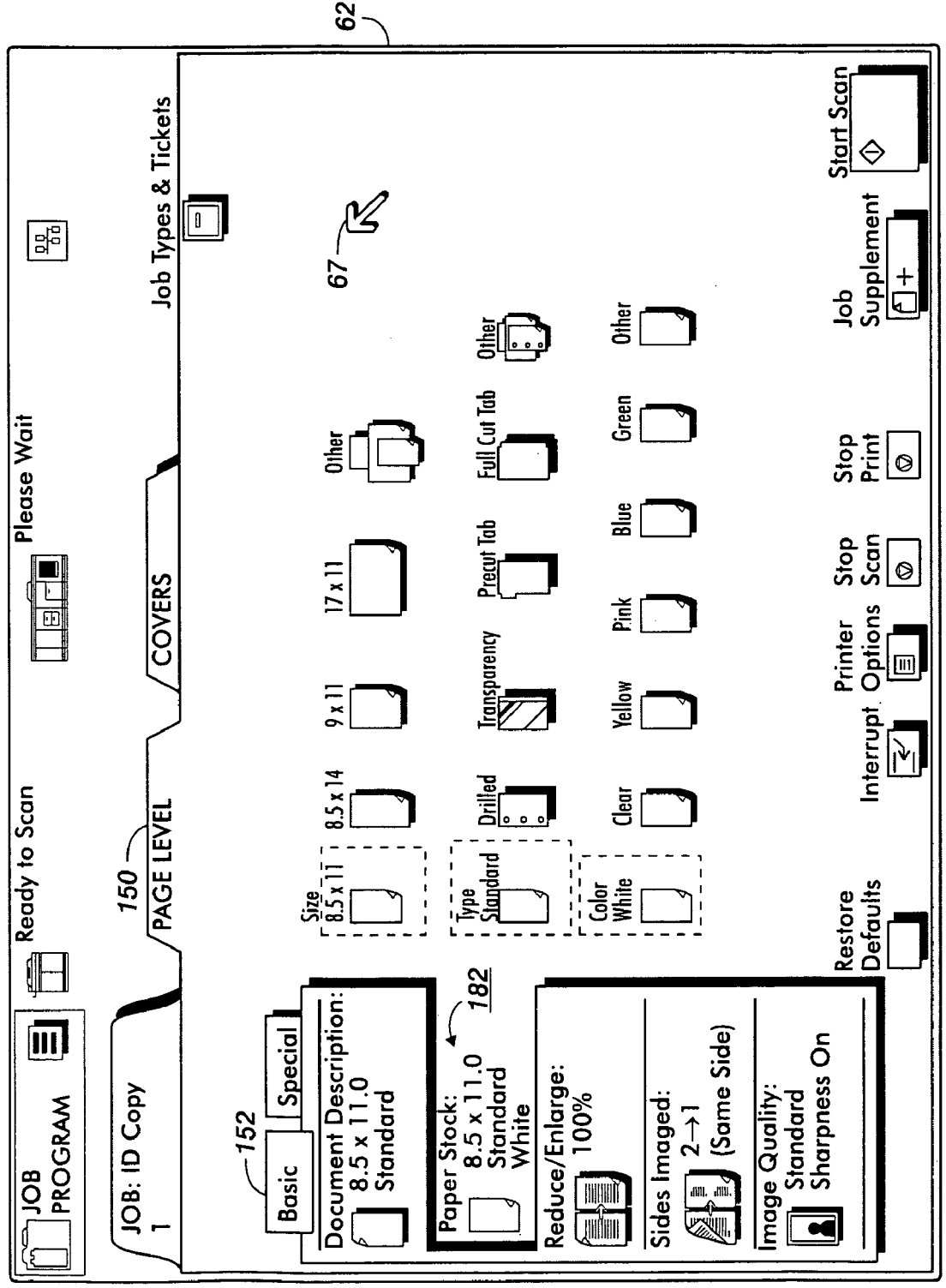
FIG. 8 is a view depicting the programming display for changing paper stock options; and, FIG. 9 is a view of the User Interface touchscreen display depicting the programming display for selecting sides imaged.

As will be understood, the size of the Paper Stock on which the images 160a, 160b are printed determines the size of images that can be printed on the chosen paper stock. Where Paper Stock of a size other than that programmed by the default setting (i.e., 8.5".times.11") is desired, Paper Stock icon 182 of "Basic" Job Ticket programming level is actuated. Referring to FIG. 8, this displays "Basic" scorecard 152 with the Paper Stock icon 182 opened. Additionally, the various Paper Stock Size, Type, and Color selections are displayed alongside scorecard 152 on touchscreen 62. By actuating the Paper Stock Size, Type, and/or Color icons desired, the specific Paper Stock onto which the images 160a, 160b will be printed is programmed.

Figure 9:
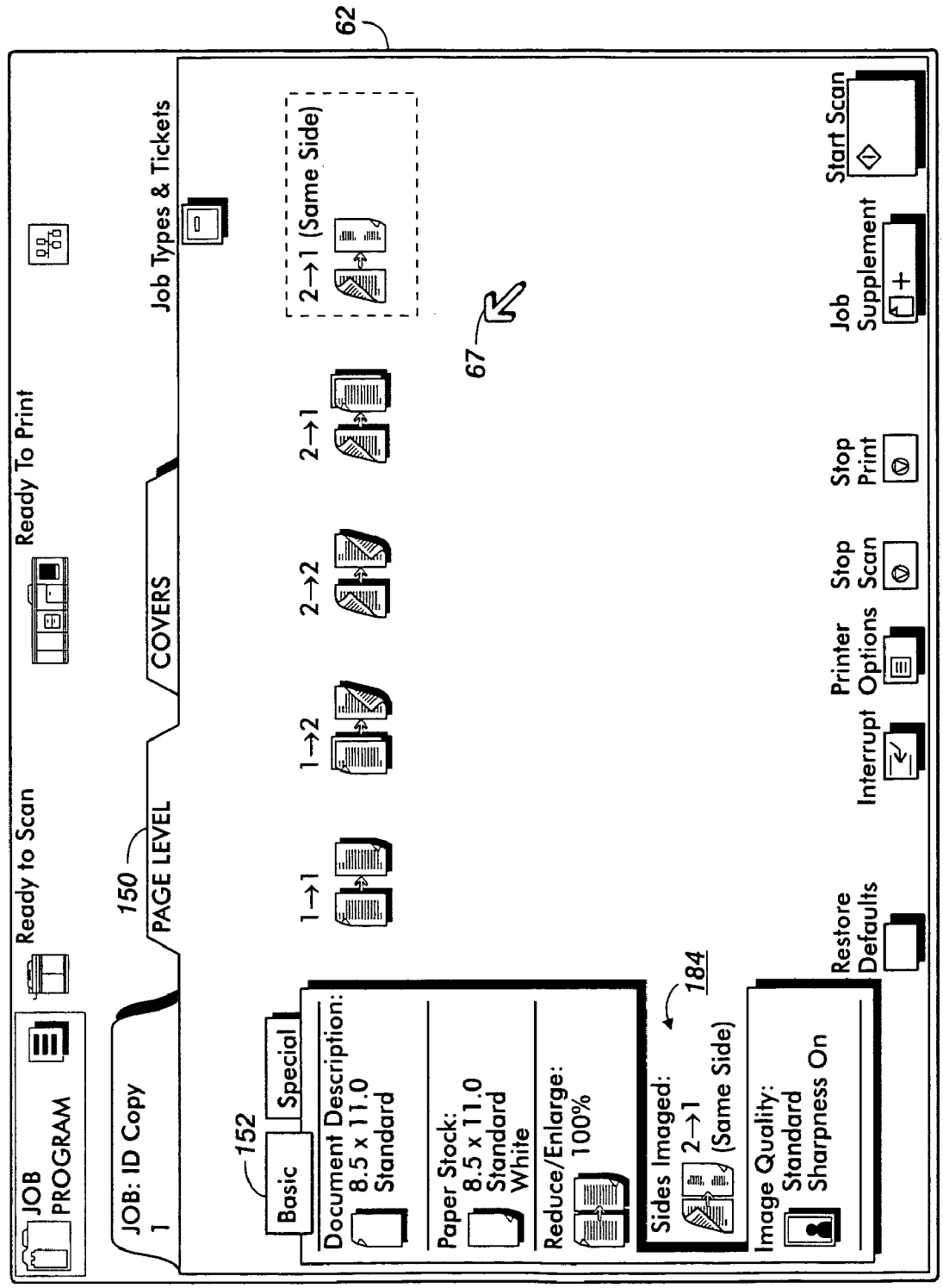

As shown in FIG. 9, the default setting for Sides Imaged 184 is same side duplex (i.e., "from two sides to same single side).

Other programming changes from the default settings shown in FIG. 9 are similarly programmed, as for example where the number (i.e., Quantity) of prints to be made is different than the default setting (i.e., "1"), or where the image(s) are to saved for future use instead of being discarded (i.e., "Destination: Print & Delete") after the prints have been made, etc.

The method for completing the above described ID copy Job Supplement can generally follow the operations outlined below. The user initiates and actuates a job supplement process on the user interface 52 to enable a job supplement print job to be built up from opposing sides of the object 22. The system initiates manual document handling mode. The user can then place a first side of an object to be scanned on the platen of the printing system. The system scans the first side image of the object. The scanning includes a scanner for scanning the platen 20 and converting objects on the platen to image signals. The system stores the first side image of the object. The user turns the object onto the second side and places the second side on the platen. The system scans a second side image of the object. The system further prints the first side image adjacent to the second side image in a single pass on a single side of a media sheet and, upon completion of scanning of the second side image, the system disables the job supplement process to enable scanning of the next job by the scanner.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for printing comprising:
actuating a job supplement process on a user interface to enable a job supplement print job to be built up from opposing sides of an object;
initiating manual document handling identification (ID) copy mode;
placing a first side of an object to be scanned on a platen of a printing system;
said object includes a width and a length having an area;
said platen includes an area;
said object area is up to about 20 percent of said platen area;
scanning only said object area including a first side image of said object, said scanning includes a scanner for scanning only said object area of said platen area and converting objects on said platen to image signals;
storing a first side image of said object;
turning said object onto a second side and placing said second side on said platen;
scanning only said object area including a second side image of said object wherein placing of said first side and said second side of said object occurs on same area of said platen;
printing said first side image adjacent to said second side image in a single pass on a single side of a media sheet; and,
on completing scanning of said second side image, disabling said job supplement process to enable scanning of the next job by said scanner.

2. The method of claim 1, wherein said object is selected from the group consisting of a driver's license, health insurance card, credit card, business card, and identification card.

3. The method of claim 1, wherein said printing said first side image and said second side image include an image orientation where said first side image and said second side image are horizontally aligned.

4. The method of claim 3, wherein said job supplement process automatically scales said first side image and said second side image according to media sheet size and image orientation such that said first side image and said second side image each comprise a majority of one half of said media sheet.

5. The method of claim 1, wherein said printing of said first side image and said second side image include an image orientation where said first side image and said second side image are vertically aligned.

6. The method of claim 5, wherein said job supplement process automatically scales said first side image and said second side image according to media sheet size and image orientation such that said first side image and said second side image each comprise a majority of one half of said media sheet.

7. A printing system comprising:
a user interface, said user interface includes an ID copy mode;
said ID copy mode includes a series of instructions directing a user to:
place side one of an object onto a platen in a given field of said platen;
press a start button on said user interface for scanning a first side image;
turn said object to a second side and place onto said platen in same said given field;
press said start button on said user interface for scanning a second side image;
said ID copy mode consists of a scan area wherein said scanning of said first side image and said second side image is restricted to said scan area;
said platen includes an area;
said scan area is up to about 20 percent of said platen area;
said object includes a width and a length having an area;
said object area is less than said scan area; and,
the printing system applies said first side image and said second side image in a single pass to a same side of a media sheet for printing.

8. The system of claim 7, wherein said object is selected from the group consisting of a driver's license, health insurance card, credit card, business card, and identification card.

9. The system of claim 7, wherein said printing said first side image and said second side image include an image orientation where said first side image and said second side image are horizontally aligned.

10. The system of claim 9, wherein said printing automatically scales said first side image and said second side image according to paper size and image orientation such that said first side image and said second side image each comprise a majority of one half of said media sheet.

11. The system of claim 7, wherein said printing of said first side image and said second side image include an image orientation where said first side image and said second side image are vertically aligned.

12. The system of claim 11, wherein said printing automatically scales said first side image and said second side image according to media sheet size and image orientation such that said first side image and said second side image each comprise a majority of one half of said media sheet.

13. A method comprising:
providing a user interface, said user interface includes an ID copy mode wherein said ID copy mode instructing a user including:
placing a first side of an object onto a platen in a given field of said platen;
pressing a start button on said user interface for scanning a first side image;
said scanning occurs only over an object area, wherein said platen includes an area and wherein said object area is up to about 20 percent of said platen area;
turning said object to a second side and placing a second side onto said platen in same said field;
pressing said start button on said user interface for scanning a second side image wherein said scanning occurs again only over said object area; and,
printing said first side image and said second side image in a single pass to a same side of a media sheet for printing.

14. The method of claim 13, wherein said object is selected from the group consisting of a driver's license, health insurance card, credit card, business card, and identification card.

15. The method of claim 13, wherein said printing said first side image and said second side image are horizontally aligned.

16. The method of claim 15, wherein said printing automatically scales said first side image and said second side image according to media sheet size and image orientation such that said first side image and said second side image each comprise a majority of one half of said media sheet.

17. The method of claim 13, wherein said printing of said first side image and said second side image are vertically aligned.

18. The method of claim 17, wherein said printing automatically scales said first side image and said second side image according to paper size and image orientation such that said first side image and said second side image each comprise a majority of one half of said media sheet.

19. A method for printing comprising:
actuating a job supplement process on a user interface to enable a job supplement print job to be built up from opposing sides of an object;
initiating manual document handling mode;
placing a first side of an object to be scanned on a platen of a printing system;
said object includes a width and a length having an area;
said platen includes an area;
said object area is up to about 20 percent of said platen area;
scanning only said object area including a first side image of said object, said scanning includes a scanner for scanning only said object area of said platen area and converting objects on said platen to image signals;
storing said first side image of said object; and,
printing said first side image.

20. The method of claim 19, further comprising:
turning said object onto a second side and placing said second side on said platen;
scanning only said object area including a second side image of said object wherein placing of said first side and said second side of said object occurs on same area of said platen; and,
storing said second side image of said object.

21. The method of claim 20, further comprising:
printing said second side image wherein said printing applies said first side image and said second side image in a single pass to a same side of a media sheet.

* * * * *